March 26, 1929.  J. PROKOP  1,706,541

INSECT DESTROYER

Filed June 25, 1928

Inventor
John Prokop.
By Samuel Herrick,
Attorney

Patented Mar. 26, 1929.

1,706,541

UNITED STATES PATENT OFFICE.

JOHN PROKOP, OF BOERNE, TEXAS.

INSECT DESTROYER.

Application filed June 25, 1928. Serial No. 288,217.

This invention relates to insect destroyers. There are certain classes of insects which attack plants principally at night and which, during the day, hide under leaves, trash and other objects. If boards be placed upon the ground adjacent the plants to be protected, the insects will hide in large numbers under these boards and if, when the boards are raised, they can be quickly collected before they escape, practically all of them can be destroyed. Therefore, it is the primary object of the present invention to provide an implement which will quickly pierce and kill large numbers of these insects, and which may be readily and quickly cleaned of the dead insects, so that the work of impaling and destroying additional insects may go forward with dispatch.

Further objects and advantages of the invention will be set forth in the detailed description which follows.

In the accompanying drawing.

Like numerals designate corresponding parts in all of the figures of the drawing.

Figure 1:
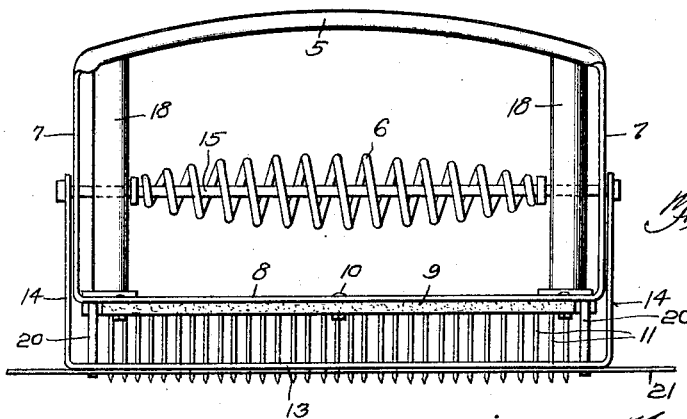
Fig. 1 is a side elevation of an insect destroyer, constructed in accordance with the invention.
Figure 3:
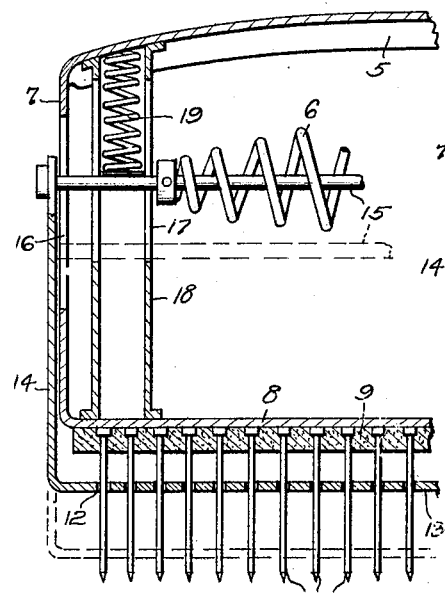
Fig. 3 is a partial vertical sectional view thereof.
Figure 2:
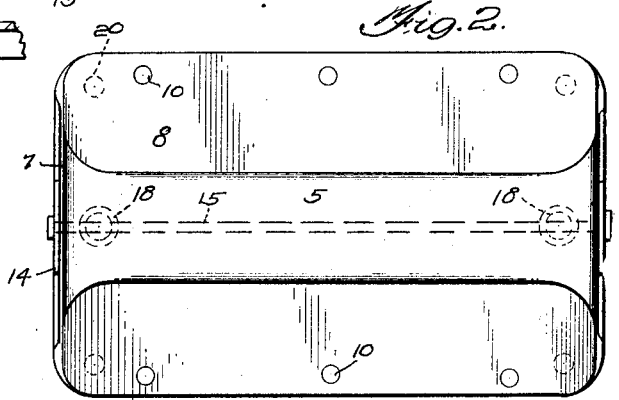
Fig. 2 is a plan view thereof.
Figure 4:
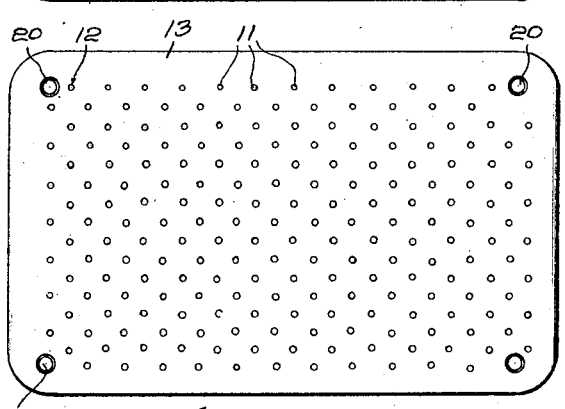
Fig. 4 is an underside plan view thereof.

The tool of the present invention embodies a gripping portion, consisting of two relatively movable parts. One of these parts consists of a bowed web 5, and the other consists of a coil handle 6. The bowed member 5 being placed in the palm of the hand, and the fingers being placed about the handle 6, it follows that a gripping action of the hand will move these two members toward each other. The bowed member 5 has downturned extremities 7 which, at their lower ends, are connected to a, preferably, rectangular plate 8. This plate has a web 9 secured to its underface by bolts or like fastening devices 10. The web 9 is of some stiff, and tough material, such as leather, and it carries a multiplicity of very sharp pins or prongs 11. These prongs pass through openings 12, formed in a stripper plate 13. This stripper plate is carried by vertical end pieces 14, the upper ends of which are supported from the outer ends of a rod 15, which constitutes a part of the handle 6. The rod 15 passes through, and is guided in, vertical slots 17 of the downturned extremities 7, of the bowed member 5. The rod 15 also passes through vertical slots 17, of vertical housings 18, which extend between the bowed member 5 and the plate 8. Springs 19, in said housings, bear upon the rod 15, and tend to thrust said rod and, consequently, the stripper plate 13, downwardly. It is clear that if, by gripping action, the bow 5 and handle 6 are brought together, against the tension of springs 19, the pins 11 will be projected to a considerable degree beyond stripper plate 13, and with the parts in this gripped manner the tool may be used to rapidly pierce and collect large quantities of bugs, worms, or other insects which may have collected under the boards. Since only one board need be lifted at a time, the insects under other boards are not disturbed, and do not seek to escape during the time that the insects under the lifted board are being impaled. When a sufficient number of the insects have been collected on the pins the mere release of the handle 6, by the fingers, will permit the springs 19 to act to thrust the stripper plate downwardly or outwardly with respect to the pins, thereby dislodging all of the insects which have been collected up to that time. Then by again gripping handle 6, the parts will be restored to position to collect additional numbers of the insects. Since the pins 11 are, in practice, quite thin and sharp it is desirable to provide means independent of said pins for keeping the parts in proper alignment. To this end I provide, upon the plate 8, guide studs 20, which pass through the stripper plate 13, and maintain the proper alignment of the parts during movement. I may, if desired, dispose a piece of cloth, such as a light cotton fabric 21, in position to be pierced by the pins and, in that event, the cloth will be forced up on the pins as the bugs are impaled. Then, if the stripper does not completely eject the collected bugs, I can secure their complete removal by the act of stripping the cloth from the pins.

It is to be understood that the invention is not limited to the precise construction set forth, but that it includes within its purview whatever changes fairly come within either the terms or the spirit of the appended claims.

Having described my invention, what I claim is:

1. A device of the character described, comprising a handle, a supporting plate carried by said handle, a multiplicity of sharply pointed impaling pins projecting downwardly from said plate, a stripper plate movable toward and from the first named plate, a spring tending to thrust the stripper plate away from the first named plate, said pins passing through the stripper plate, and a handle element connected to the stripper plate, movement of said handle member being against the tension of said spring.

2. A device of the character described, comprising a member adapted to rest in the palm of the hand, a handle lying in spaced relation thereto, downturned extensions at the outer ends of the said member, a plate at the lower ends of said extensions, a multiplicity of sharp pins carried by said plate, a stripper plate through which said pins pass, means for connecting the stripper plate to said handle, and spring means tending to force the handle and stripper plate away from said first named member.

3. A device of the character described, comprising a member adapted to rest in the palm of the hand, a handle lying in spaced relation thereto, downturned extensions at the outer ends of the said member, a plate at the lower ends of said extensions, a multiplicity of sharp pins carried by said plate, a stripper plate through which said pins pass, means for connecting the stripper plate to said handle, spring means tending to force the handle and stripper plate away from said first named member, and guiding members between the first named plate and the stripper plate.

4. A device of the character described, comprising a member adapted to lie in the palm of the hand, having vertical extensions at its ends, and a plate at the lower ends of said extensions, a multiplicity of sharp piercing pins carried by said plate, a stripper plate through which said pins pass, upturned extensions carried by said stripper plate, a handle extending between the upper ends of the extensions of the stripper plate, and movable in slots formed in the end extensions of the first named member, housings extending between the first named member and the first named plate through which said handle passes, and springs in said housings acting upon the handle to thrust the stripper plate away from the first named plate.

In testimony whereof he affixes his signature.

JOHN PROKOP.